(12) United States Patent
Singh et al.

(10) Patent No.: US 9,885,270 B2
(45) Date of Patent: Feb. 6, 2018

(54) DEVICE FOR REMOVING PARTICULATE MATTER FROM EXHAUST GASES OF INTERNAL COMBUSTION ENGINE

(71) Applicants: Adess Singh, Punjab (IN); Rajandiep Singh Tiwana, New Delhi (IN)

(72) Inventors: Adess Singh, Punjab (IN); Rajandiep Singh Tiwana, New Delhi (IN)

( * ) Notice: Subject to any disclaimer, the term of this patent is extended or adjusted under 35 U.S.C. 154(b) by 212 days.

(21) Appl. No.: 14/902,290

(22) PCT Filed: Jul. 1, 2013

(86) PCT No.: PCT/IB2013/055387
§ 371 (c)(1),
(2) Date: Dec. 30, 2015

(87) PCT Pub. No.: WO2015/001380
PCT Pub. Date: Jan. 8, 2015

(65) Prior Publication Data
US 2016/0138449 A1    May 19, 2016

(51) Int. Cl.
*B01D 50/00*    (2006.01)
*B01D 59/50*    (2006.01)
(Continued)

(52) U.S. Cl.
CPC ............... *F01N 3/037* (2013.01); *F01N 3/01* (2013.01); *F01N 3/0217* (2013.01);
(Continued)

(58) Field of Classification Search
CPC .......... F01N 3/037; F01N 3/01; F01N 3/0217; F01N 3/0222; F01N 3/0226; Y02T 10/20
See application file for complete search history.

(56) References Cited

U.S. PATENT DOCUMENTS 3,129,078 A * 4/1964 Hobbs .................. F01N 3/0226
                                                          181/282
3,633,343 A * 1/1972 Mark ..................... F01N 3/0217
                                                           55/323
(Continued)

*Primary Examiner* — Amber R Orlando
(74) *Attorney, Agent, or Firm* — Morrison & Foerster LLP

(57) ABSTRACT

A device to trap and remove particulate matter from exhaust of internal combustion engines, without increasing resistance to the flow of engine exhaust is disclosed herein. The system is provided with a single or a plurality of ducts (1 & 2) through which exhaust gases enter tangentially into a hollow chamber (3), causing the gases to spin at high speeds. The spinning gases generate centrifugal force resulting in separation of particulate matter from the exhaust gases. The hollow chamber (3) contains ports (4) and radial projections (5) on its axial surface to allow the separated particulate matter to enter into a trap (6). The particulate matter entering the trap (6) gets stuck to a fine mesh of high temperature resistant porous material that may or may not be electrically charged. The trap (6) is enclosed in a cover (7) that encases the fine mesh which surrounds the ports (4) and radial projections (5). The cover (7) has a single or plurality of ducts (8) connecting the trap (6) to the low pressure area of the rotating gases in the hollow chamber (3) through the port (9) provided at the proximal end of the hollow chamber (3).

13 Claims, 3 Drawing Sheets

(51) Int. Cl.
  *F01N 3/037* (2006.01)
  *F01N 3/021* (2006.01)
  *F01N 3/01* (2006.01)
  *F01N 3/022* (2006.01)

(52) U.S. Cl.
  CPC ......... *F01N 3/0222* (2013.01); *F01N 3/0226* (2013.01); *Y02T 10/20* (2013.01)

(56) References Cited

U.S. PATENT DOCUMENTS

| | | | | |
|---|---|---|---|---|
| 3,853,512 A * | 12/1974 | Hayashi | ............... | B03C 3/14 |
| | | | | 128/205.29 |
| 3,966,443 A * | 6/1976 | Okano | ............... | B01D 53/86 |
| | | | | 422/177 |
| 4,297,116 A * | 10/1981 | Cusick | ............... | B01D 46/002 |
| | | | | 55/319 |
| 5,223,009 A * | 6/1993 | Schuster | ............... | F01N 3/0211 |
| | | | | 55/302 |
| 5,355,973 A * | 10/1994 | Wagner | ............... | F01N 1/003 |
| | | | | 181/232 |
| 5,575,980 A * | 11/1996 | Turek | ............... | B01D 53/94 |
| | | | | 422/171 |
| 5,653,105 A * | 8/1997 | Noirot | ............... | B01D 53/9481 |
| | | | | 422/169 |
| 5,857,326 A * | 1/1999 | Blanchet | ............... | B01D 45/16 |
| | | | | 55/457 |
| 6,770,252 B2 * | 8/2004 | Cheng | ............... | B01D 46/002 |
| | | | | 422/171 |
| 7,279,022 B2 * | 10/2007 | Johnson | ............... | B01D 45/16 |
| | | | | 55/399 |
| 7,351,383 B2 * | 4/2008 | Jobson | ............... | F01N 3/2006 |
| | | | | 422/176 |
| 7,537,083 B2 * | 5/2009 | Frederiksen | ............... | F01N 1/04 |
| | | | | 181/212 |
| 7,662,220 B2 * | 2/2010 | Fukano | ............... | B01D 45/14 |
| | | | | 55/400 |
| 9,670,811 B2 * | 6/2017 | De Rudder | ............... | B01F 3/04049 |
| 2010/0263359 A1 * | 10/2010 | Haverkamp | ............... | F01N 3/2066 |
| | | | | 60/303 |
| 2011/0219755 A1 * | 9/2011 | Muller-Haas | ............... | F01N 3/035 |
| | | | | 60/287 |

* cited by examiner

DEVICE FOR REMOVING PARTICULATE MATTER FROM EXHAUST GASES OF INTERNAL COMBUSTION ENGINE

CROSS REFERENCE TO RELATED APPLICATIONS

This application is U.S. National Phase Application of International Application No. PCT/IB2013/055387, filed Jul. 1, 2013, the entire content of which is incorporated herein by reference in its entirety.

TECHNICAL FIELD

The subject matter relates to the removal of particulate matter from gases and more particularly, to a device for the removal of particulate matter contained in the exhaust of internal combustion engines without increasing the resistance to the flow of exhaust gases.

BACKGROUND

The exhaust gases coming out of the internal combustion engines contain particulate matter. This particulate matter in the environment is a well recognized health hazard of serious proportion. The finer the size of the particulate matter, the greater the chance it will remain suspended in air and, therefore, the more harmful are its impacts on both health and environment. The fine particulate matter generated by combustion of fuel carries with it substances that are known allergens, carcinogens and mutagenic agents. This fine particulate matter, because of its small size, travels deep into the respiratory tree, very often reaching the alveolar level, where it begins to cause serious diseases. Bronchitis, asthma, lung abbess and cancer have all, in a major part, been attributed to high levels of inhalable particulate matter in the atmosphere.

The consequences of fine particulate matter becomes much more severe because of its nature of not settling down and remaining in circulation in the air; it is often carried to high altitudes by convection currents. At cloud formation heights, this fine particulate matter acts as nuclei for water vapor condensation, forming clouds. The clouds so formed are heavier than the naturally formed clouds and are not sufficiently carried by the prevailing winds. Such clouds result in skewed distribution of rainfall such that some areas are subjected to very heavy and damaging downpour whereas others suffer drought like conditions.

Various methods have been attempted in the past to overcome the problem of particulate matter prevalent in the flowing gases, i.e. either in the exhaust stream of internal combustion engines or in the effluent gases in various industrial processes or furnaces.

One of the methods employed in the past enables internal combustion engines to use an array of sensors along with a microprocessor to ensure that the correct air-fuel mixture is maintained at all times and through all load conditions so as to get better combustion and thus, produce less particulate matter. The pre-treatment of fuel through temperature and chemical additives is another method that has been employed to achieve efficient combustion and hence, reduced particulate matter production.

The abovementioned methods pertain to the pre-ignition stage in the internal combustion engine. Once ignition occurs, all the exhaust matter needs to be pushed out of the cylinder so that the cylinder is ready and empty to accept the next air-fuel charge. The exhaust material is expelled out of the cylinder with a lot of noise and to reduce the noise, sound reducers or mufflers are put in line of flow of exhaust matter.

The catalytic converter, which is intended to convert harmful gases to less harmful ones, is also placed in line of flow of the exhaust matter.

It is further studied that any attempt to place a filter in line with the flow of exhaust increases the resistance to the flow of exhaust or causes backpressure in the flow. This prevents the engine cylinder from fully voiding itself of the exhaust gases generated by the ignition of previous air-fuel charge and is unable to perform an efficient combustion by not being able to accept the next pocket of air-fuel charge. Also, the increased resistance to flow of exhaust gases results in the loading of the engine i.e., the engine has to do more work in order to vent the exhaust material and this has a negative impact on fuel consumption. Further, the in-line filters get clogged with the particulate matter which need to be unclogged using some regenerative technology. During the process of regeneration, the particulate matter is expelled out and this particulate matter, being very fine in nature, is much more harmful.

Settling and momentum separators are also being used for removal of particulate matter from flowing gases wherein particles are collected by gravity and by their inertia, due to a sudden change in the direction of exhaust gases. Momentum separators are not effective because of the low mass of the particles involved.

There is another method known in the art for removing particulate matter from the flowing gases; namely cyclone or vortex separators which operate by incorporating centrifugal, gravitational, and inertial forces to remove particles suspended in air or gas. These types of separators use cyclonic action to separate particulates from a gas stream.

The most common type of cyclone separator used in industry is reverse flow type, wherein the gas enters through a tangential inlet at the top of the cyclone body, shaped to create a confined vortex gas flow and the clean gas exits through a central pipe.

Some of the major disadvantages with cyclone separators are that they have low efficiencies (particularly for small particles) and are unable to process "sticky" materials.

Some of the other methods used in the past include "Electrostatic Separators" and "Wet Collectors or Scrubbers".

In view of foregoing, it is quite evident that all the above mentioned methods presently employed for removing particulate matter from flowing stream of gas are unable to separate the particulate laden gases in an effective and desired manner. Thus, it is a subject of immediate requirement to efficiently remove the particulate matter from the stream of flowing gases, especially the ones accompanying the exhaust of internal combustion engines and thereby reduce the harmful effects of particulate matter emitted in the environment.

SUMMARY

It is an object of the present invention to remove particulate matter from the exhaust of internal combustion engines.

It is a further object of the present invention to trap the particulate matter present in the exhaust gases in an enclosed trap.

It is yet another object of the present invention to remove the particulate matter without increasing the resistance to the flow of exhaust gases, thereby reducing the work done by the engine in exhausting the gases.

It is yet another object of the present invention to minimize the capital cost and maintenance requirements by not using any moving part in the system.

The present subject matter comprises a device for removing particulate matter from the exhaust gases of internal combustion engines. The device includes a hollow chamber (3) having a proximal end (11), a distal end (10) and an intermediate portion, a means for tangentially introducing the exhaust gas at the proximal end (11) of the hollow chamber (3), a trap (6) for trapping the particulate matter in the exhaust gas and a means for drawing the portion of the exhaust gas containing the particulate matter from the trap (6) to a low pressure area in the hollow chamber (3). The intermediate portion of the hollow chamber (3) draws the particulate matter and a portion of the exhaust gas containing the particulate matter into the trap (6).

In a preferred embodiment of the present subject matter, the means for introducing the exhaust gas into the hollow chamber (3) in a tangential direction comprises at least one duct (1, 2) provided at the proximal end (11) of the hollow chamber (3).

In a preferred embodiment of the present subject matter, a plurality of ducts (1, 2) is provided at the proximal end (11) of the hollow chamber (3).

In a preferred embodiment of the present subject matter, the intermediate portion of the hollow chamber (3) comprises a plurality of ports (4) for drawing the particulate matter and a portion of the exhaust gas with the particulate matter into the trap (6).

In a preferred embodiment of the present subject matter, the intermediate portion of the hollow chamber (3) comprises a plurality of radial projections (5) for drawing off the particulate matter and a portion of the exhaust gas with the particulate matter into the trap (6).

In a preferred embodiment of the present subject matter, the radial projections (5) have an axial width and a plurality of ports. In a preferred embodiment of the present subject matter, the trap (6) is provided with a high temperature resistant porous material (not shown for the sake of simplification).

In a preferred embodiment of the present subject matter, the trap (6) is formed by a cover (7) enclosing the intermediate portion of the hollow chamber (3) such that there is space between the hollow chamber and the outer cover to contain charged or uncharged porous entrapping material.

In a preferred embodiment of the present subject matter, the distal end (10) of the hollow chamber (3) is open for emitting the exhaust gases.

In a preferred embodiment of the present subject matter, the means for drawing the portion of the exhaust gas with the particulate matter from the trap (6) to the low pressure area in the hollow chamber (3) comprises at least one duct (8, 12).

In a preferred embodiment of the present subject matter, a plurality of ducts (8, 12) coincide with each other for drawing the portion of the exhaust gas with the particulate matter from the trap (6) to the low pressure area in the hollow chamber (3).

BRIEF DESCRIPTION OF DRAWINGS

A further understanding of the present invention can be obtained by reference to a preferred embodiment set forth in the illustrations of the accompanying drawings. The drawings are not intended to limit the scope of this invention, which is set forth with particularity in the claims as appended or as subsequently amended, but merely to clarify and exemplify the subject matter.

For a more complete understanding of the present invention, reference is now made to the following drawings in which.

DETAILED DESCRIPTION

Figure 1:
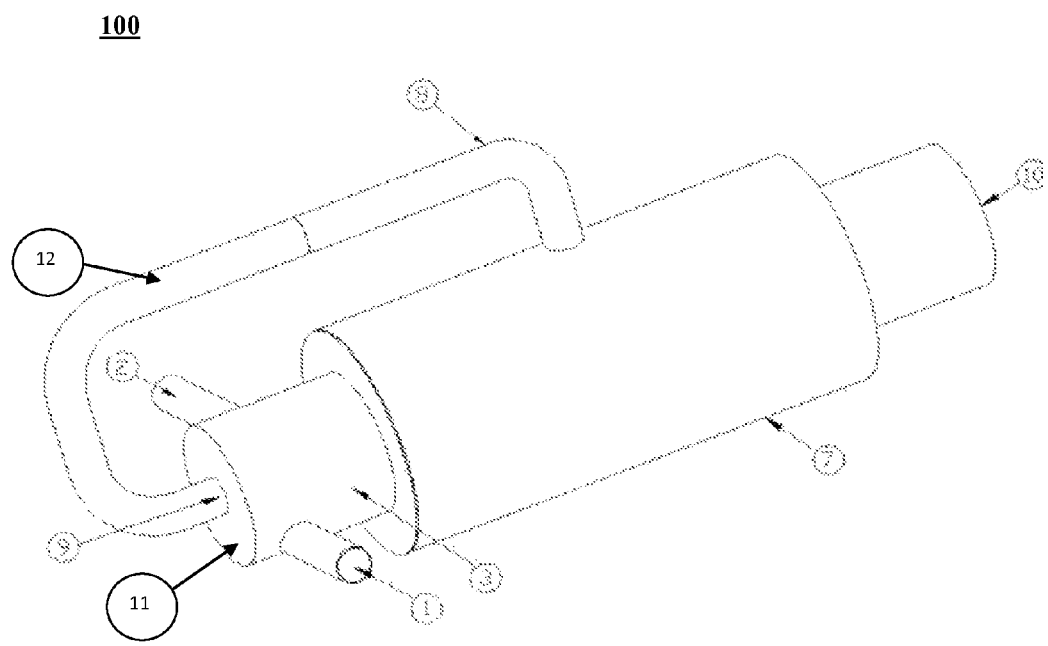
FIG. 1 is a three dimensional line diagram showing the assembly of a device for removal of particulate matter from the exhaust of internal combustion engines in accordance with an embodiment of the present subject matter.

The following presents a detailed description of a preferred embodiment (as well as some alternative embodiments) of the present invention with reference to the accompanying drawings.

The embodiments of the present subject matter are described in detail with reference to the accompanying drawings. However, the present subject matter is not limited to these embodiments which are only provided to explain more clearly the present subject matter to the ordinarily skilled in the art of the present disclosure. In the accompanying drawings, like reference numerals are used to indicate like components.

According to an embodiment of the present subject matter, the assembly of a device (100) used for the removal of particulate matter from the exhaust of internal combustion engines is shown in FIG. 1. The FIG. 1 is shown for example only and by no way limits the scope of the subject matter. The device (100) is manufactured from a plurality of components. The components of the device (100) include, but are not limited to, a plurality of ducts (1, 2, 8, 12), a hollow chamber (3), a trap (6), a cover (7) etc. The hollow chamber (3) is provided with at least one duct (1, 2) in such a manner that the exhaust gases coming from the internal combustion engine enter into the hollow chamber (3) in a tangential direction. In an embodiment of the present subject matter, the hollow chamber (3) is provided with a plurality of ducts i.e. a first duct (1) and a second duct (2). The hollow chamber (3) is open at the distal end (10) and is closed at the proximal end (11). The proximal end (11) of the hollow chamber (3) is provided with a port (9), through which a fourth duct (12) emerges and coincides with a third duct (8) provided on the cover (7).

The subject matter described above can be embodied in many ways as would be obvious and known to a person skilled in the art. For example, the ducts (1, 2, 8 & 12) described above are embodied as having a circular cross section. The shape and size of these ducts can be varied to any desired shape or size as is obvious to a person skilled in the art. Similarly, the number of ducts (1, 2, 8 & 12) is not limited to what has been described in the above embodiment. In different embodiments, the number of ducts can also be varied as desired.

Figure 2:
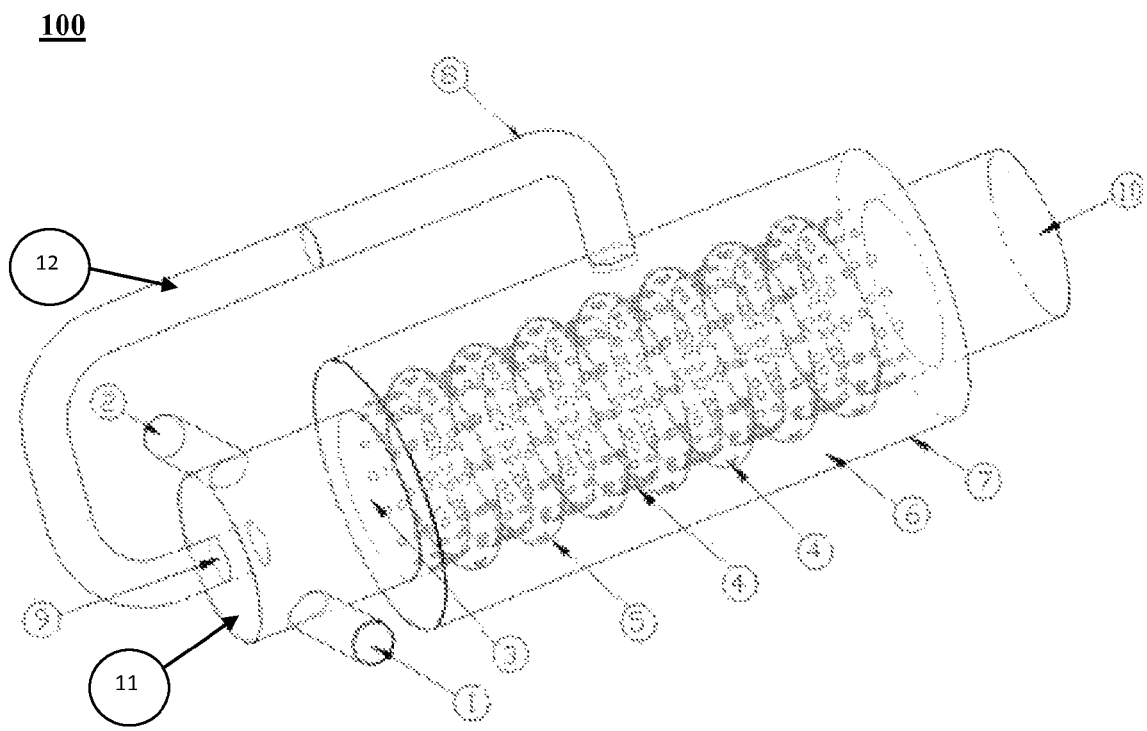
FIG. 2 is a schematic illustration of the device depicting the operation of the device in accordance with an embodiment of the present subject matter.
Figure 3:
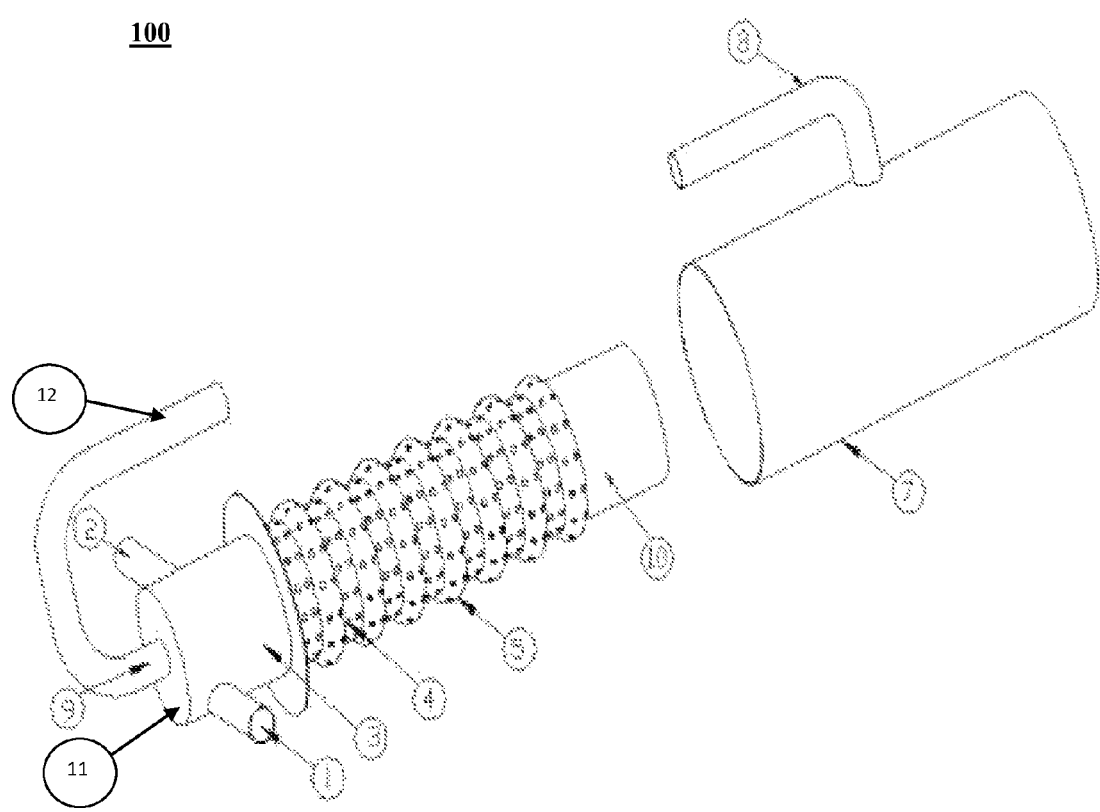
FIG. 3 is an exploded view of the device in accordance with a preferred embodiment of the present subject matter.

FIGS. 2 and 3 depict a schematic representation and an exploded view of the device (100) of FIG. 1. As shown in the figures, the intermediate portion of the hollow chamber (3) is provided with plurality of ports (4) located on the surface of the hollow chamber which has radial projections (5) indented at specific intervals along the length of the hollow chamber (3). The intermediate portion of the hollow chamber (3) is surrounded by the cover (7), enclosing the hollow chamber (3). The space between the cover (7) and hollow chamber (3) is filled with high temperature resistant porous material forming the trap (6) for the particulate matter.

The radial projections (5) are a plurality of protrusions running along the wall of the hollow chamber (3). These protrusions are in the radial direction of the hollow chamber (3) and have a radial depth and their width is in the axial direction of the hollow chamber (3). As in the case of the balance surface of the intermediate portion of the hollow chamber (3), these protrusions also have multiple ports (4) on their surface to facilitate the movement of the particulate matter into the trap (6); the space formed between the hollow chamber (3) and cover (7) and filled with high temperature resistant porous material.

When the exhaust gases are tangentially introduced into the hollow chamber (3), these gases, along with the particulate matter present in them, spin at very high speed, experiencing a centrifugal force in the radial direction. Under this force, the particulate matter travels radially outwards while travelling axially along the hollow chamber (3). In addition to some particulate matter flowing out of the ports provided in the plane surface of the hollow chamber (3), the radial projections (5) vastly enhance the exit of the particulate matter through the ports provided on them as the particulate matter which enters these radial projections (5) is unable to flow backwards into the hollow chamber (3) because of the direction of the centrifugal force. The radial projections (5) act as a centrifugal trap for the particulate matter before it flows into the main trap (6) where it gets collected.

The cover (7) is provided with the third duct (8) that, in combination with the fourth duct (12), connects the trap (6), having higher pressure, to the low pressure area at the center of the proximal end (11) of the hollow chamber (3). The exhaust gases entering the hollow chamber (3) through the first and second ducts (1 & 2) create a cyclonic flow with high rotational speed and pass through the length of the hollow chamber (3) towards the distal end (10) and get emitted. As the exhaust gases flow through the intermediate portion of the hollow chamber (3), the particulate matter present in them is forced out of the hollow chamber (3) through the multiple ports (4) into the outer cover (7) and gets entrapped in a high temperature resistant porous material forming the trap (6).

Referring FIG. 2, the operation of the device to remove the particulate matter from the exhaust gases of the internal combustion engine is explained in accordance with an embodiment of the present subject matter. The exhaust gases coming from the engine are allowed to enter into the hollow chamber (3) through ducts (1 & 2) in a tangential direction. The hollow chamber (3) is closed at the proximal end, such that a high rotational motion of the exhaust gases is set up. The distal end (10) of hollow chamber (3) is open for releasing the exhaust gases, which are free of the particulate matter. This high rotational motion of the exhaust gases causes a centrifugal force to act on the particulate matter present in the exhaust gases and it is under the influence of this centrifugal force that the particulate matter is forced to move radially away into the trap (6) through the ports (4) in the intermediate portion of the hollow chamber (3).

The intermediate portion of the hollow chamber (3) is provided with a plurality of ports (4), which allow the particulate laden gas to enter into the trap (6) enclosed by the cover (7). The entry of particulate laden gas into the trap (6) raises the pressure in the enclosed trap (6). The hollow chamber (3) is also provided with radial projections (5) having axial width. The radial projections (5) also possess ports for the radial flow of particulate laden gases into the trap (6). The purpose of these radial projections (5) is to act as an additional centrifugal trap such that the particulate matter present in the rotating particulate laden gases that enter the radial projections (5) is unable to fall back towards the out-going particulate free exhaust gases, due to the opposing centrifugal force of the rotating mass of gases.

In accordance with a preferred embodiment, the radial projections (5) are provided with axial width in the form of a helix. However, any other configuration of the radial projections (5) can be embodied as is obvious and known to a person skilled in the art.

The axial surface of hollow chamber (3) having ports (4) and radial projections (5) with axial width that allows the particulate laden gas containing particulate matter to enter into an enclosed trap (6) further comprises of a fine mesh of high temperature resistant porous material on which the particulate matter gets deposited or the particulate matter sticks to the porous material. The high temperature resistant porous material described above can have as many embodiments as obvious and known to a person skilled in the art.

In accordance with a preferred embodiment of the present subject matter, the high temperature resistant porous material is a glass wool or glass wool mixed with metal wool.

In accordance with another embodiment(s) of the present subject matter, the high temperature resistant porous material is a porous ceramic or metal lattice structure, multi layered fine mesh net made of metal or ceramic, porous earthen ware lattice structure, electrically charged porous material and any other porous material used for similar function or a combination thereof. In accordance with a preferred embodiment of the present subject matter, the cover (7) encloses the trap (6) which is formed by placing the porous material over the ports (4) and the radial projections (5) present on the intermediate portion of the hollow chamber (3).

Further, to assist the flow of particulate matter into the trap (6), a pressure gradient is maintained in the trap (6), for which the cover (7) is provided with a duct (8) that connects the trap (6) having higher pressure to the low pressure area of the rotating gases in the hollow chamber (3) through the proximal end (11) of the hollow chamber (3) for which a suitable port (9) is provided at the proximal end of the hollow chamber (3).

In accordance with a preferred embodiment of the present subject matter, any particulate matter that is not trapped in the enclosed trap (6), i.e. does not get stuck to the porous material (6), is sent back to the centre of rotating exhaust gases at the proximal end (11) of the hollow chamber (3) through the duct (8) on the cover (7) of the trap (6) and a port (9) at the proximal end of the hollow chamber (3).

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

We claim:

1. A device for trapping and removing particulate matter from exhaust gases of an internal combustion engine, the device comprising:
    a hollow chamber comprising one or more ducts
    for introducing the exhaust gas containing particulate matter into the hollow chamber in a tangential direction, thereby causing the exhaust gas to spin with high rotational speeds and generating a centrigufal force, resulting in the movement of particulate matter towards a wall of the hollow chamber and creating a low pressure area in the center of the hollow chamber
wherein the hollow chamber comprises, on axial surfaces of the hollow chamber, a plurality of radial projections and a plurality of ports, wherein the radial projections comprise some of the plurality of ports, and wherein the plurality of ports provide passage for the particulate matter and a portion of the exhaust gas containing the particulate matter to flow under the influence of centrifugal force into a trap.

2. The device as claimed in claim 1, wherein the radial projections comprises a radial depth and an axial width.

3. The device in any of the preceeding claims, wherein the radial projections are is in the form of a helix.

4. The device as claimed in claim 1, wherein the plurality of ducts is provided at the proximal end of the hollow chamber.

5. The device as claimed in claim 1, wherein the trap is formed by a cover enclosing an intermediate portion of the hollow chamber.

6. The device as claimed in claim 5, wherein the trap is provided with a high temperature resistant porous material.

7. The device as claimed in claim 6, wherein the high temperature resistant porous material is a glass wool or glass wool mixed with metal wool.

8. The device as claimed in claim 6, wherein the high temperature resistant porous material is a porous ceramic or metal lattice structure.

9. The device as claimed in claim 6, wherein the high temperature resistant porous material is a multilayered fine mesh net made of metal or ceramic, a porous earthen ware lattice structure or an electrically charged porous material.

10. The device as claimed in claim 1, wherein the distal end (10) of the hollow chamber comprises a distal end open for emitting the exhaust gas free of particulate matter, into the atmosphere.

11. The device as claimed in claim 1, further comprising a connection between an outer axial surface of the trap and the low pressure area in the hollow chamber, wherein a pressure gradient between the relatively high pressure in the trap and the low pressure in the center of the hollow chamber assists the flow of particulate matter and exhaust gases containing the particulate matter from the hollow chamber through the ports into the trap.

12. The device as claimed in claim 11, wherein the connection comprises a plurality of ducts coincident with each other.

13. The device as claimed in claim 12, wherein the plurality of ducts are provided on the proximal end of the hollow chamber and on a cover enclosing an intermediate portion of the hollow chamber.

* * * * *